United States Patent
Ketelaars et al.

[11] Patent Number: 6,106,420
[45] Date of Patent: Aug. 22, 2000

[54] CONTINUOUSLY VARIABLE TRANSMISSION

[75] Inventors: Johannes Antonius Adrianus Ketelaars, Vinkel; Hendrikus Adrianus Arnoldus Wilhelmina Pelders, Nuland; Arjen Brandsma; Adrianus Albertus Antonie Van Heeswijk, both of Tilburg; Johannes Hendrikus Van Lith, Berlicum, all of Netherlands

[73] Assignee: Van Doorne's Transmissie B.V., Am Tilburg, Netherlands

[21] Appl. No.: 09/252,660

[22] Filed: Feb. 19, 1999

[30] Foreign Application Priority Data

Feb. 19, 1998 [NL] Netherlands ............ 1008347

[51] Int. Cl.[7] .............. F16H 9/00; F16H 59/00; F16H 61/00
[52] U.S. Cl. .................. 474/2; 474/18; 474/70; 474/71
[58] Field of Search ............ 474/1, 2, 8, 11, 474/12, 17, 18, 28, 46, 69, 70, 71

Primary Examiner—David A. Bucci
Assistant Examiner—Matthew A. Kaness
Attorney, Agent, or Firm—Young & Thompson

[57] ABSTRACT

A continuously variable transmission and a drive train having a continuously variable transmission. The transmission is provided with a drive pulley and a driven pulley, each having at least one axially displaceable disc in order to be able to pinch an endless transmission element between the discs of a pulley, the transmission being controlled, at least during full movement of the pulleys, in such a way that the pinching force of the drive pulley is dependent on the pinching force applied to the transmission element via the secondary pulley, and the pinching force applied being determined, at least in part, as a function of a torque which is to be transmitted. The transmission is adapted in such a manner that, at least while the pulleys are at a standstill or during the initial revolutions of the driven pulley, prior to the abovementioned method of control during full movement, the transmission is controlled in a different way which effects the presence of pinching force in the primary pulley.

30 Claims, 2 Drawing Sheets

CONTINUOUSLY VARIABLE TRANSMISSION

FIELD OF THE INVENTION

The present invention relates to a continuously variable transmission as described in the preamble of Claim 1.

BACKGROUND OF THE INVENTION

A transmission of this nature is known, for example from European Patent Publication EP-A-0,451,887. In this known transmission, the transmission of torque in accordance with the preamble of Claim 1 is realized by means of hydraulic pressure, which is applied via the driven or secondary pulley, with the aid of a so-called "master-slave" control mechanism. The "master-slave" control mechanism is based on the fact that the pinching force applied via a pulley, Arcing to the wedge-like contact of the endless element or the belt in a pulley, causes reaction forces which, as a result of displacement of the belt, result in a corresponding pinching force in the bearing of the belt in the other pulley.

Continuously variable transmissions of the present type have the current drawback that the transmission is susceptible to slip if the radius over which the transmission element is in contact with a pulley is small. Therefore, similar transmissions are known in which the pinching force is constantly applied alternately as a function of the transmission ratio during operation, to that pulley in which the radius of contact with the belt is smaller. This type of control has the characteristic feature that the hydraulics have to be very accurately controlled and that the alternations during operation may occur very frequently, depending on the conditions in traffic. Applying pinching force using the control system of the transmission to which the invention relates, namely exclusively, at least in principle, from the driven, alternatively denoted, secondary pulley, avoids such alternations and, inter alia, has the advantages that the means for applying the pinching force, in this case the hydraulics and the control mechanism for the hydraulics, can be kept relatively simple. In the standard case of applying pinching force by means of hydraulic pressure, pump pressure applied can be applied to the secondary pulley without the intervention of hydraulic control elements, and it is possible for the control mechanism to comprise relatively simple hydraulic control elements which have been optimized for their particular function.

In the known transmission, an electronic control system is used to determine the pinching force which is to be applied to the secondary pulley in order to realize a slip-free transmission of a torque to be transmitted, in the primary pulley as well. In the known transmission, the magnitude of the torque to be transmitted is determined, inter alia, on the basis of the throttle position detected and the vehicle speed detected. The pinching force determined in this way is kept as low as possible, in order to prevent energy losses while nevertheless taking into account a safety margin.

Tests and practical experience on commercially available vehicles have shown that such a control for a variable speed gearbox functions as expected and correctly under rotating conditions. Nevertheless, undesirable traces of apparently short-lived slip may be found on contact surfaces of the drive pulley and the belt in the known transmission. The present invention is based on the problem of establishing a cause for such traces of slip. The invention aims to arrive at a control system adapted so as to take into account the cause established, while maintaining the energy-efficient nature of the present control mechanism. According to the invention, this object is achieved by means of the measure according to the characterizing portion of Claim 1.

SUMMARY OF THE INVENTION

According to the insight on which the invention is based, the abovementioned traces are at least partially caused when the transmission is started up, and the belt is in an untensioned state when the transmission is first set into operational state. Measurements forming the basis of the invention have demonstrated that in this state pinching force applied to the belt by the secondary pulley does not result in corresponding reaction forces in the primary pulley, so that the pinching force prevailing in the latter is insufficient to prevent slip. A further problem underlying the invention then also consists of achieving sufficient pinching force on the drive pulley in the state of the transmission described above. The present invention then also consists in recognizing in the control system of the transmission the state in which the transmission is started up from a standstill and which precedes the normal operation of the transmission. According to a first refinement of the solution of the problem underlying the invention, the abovementioned difference in the state of the transmission is expressed by substantially increasing the pinching force applied when at a standstill, compared to the pinching force which would be applied on the basis of a torque to be transmitted in the rotating state.

A particular advantage of the design according to the invention is that the belt is tensioned even when at a standstill only on the basis of the torque to be transmitted. This is important because applying pinching force entails consumption of power and therefore a reduction in the efficiency of the transmission. The design according to the present invention ensures that in the absence of torque to be transmitted when at a standstill, tensile force is not applied unnecessarily. Another advantage of the present invention is that the control system which is already used in the transmission can largely be implemented while adhering to the rules employed and in principle without the need to provide additional hardware.

In a second particular refinement of the solution to the problem underlying the invention, the tensioned state of the belt when at a standstill is achieved by applying pinching force via the primary pulley. Outwards, i.e. radial movement of that part of the belt which is in the primary pulley has been found to be achievable, when at a standstill, even by applying a very low pinching force, in relative terms, to the primary pulley. Nevertheless, in this embodiment too, pinching force has to be applied to the secondary side in order to prevent shifting of the transmission, alternatively denoted, a change in the transmission ratio. In this particular solution, the pinching force applied to the driven pulley may advantageously be lower than that which is applied by the control system in the subsequent rotating conditions, via the driven pulley, in order to transmit a corresponding torque, a situation which is made possible by the fact that in this case the friction force between belt and secondary pulley works to the advantage of the intended effect.

In a preferred embodiment of the invention, the transmission is not switched over to a pinching force magnitude associated with rotating conditions before at least one revolution of the driven pulley has taken place. Although it is desirable for this changeover to a lower pinching force to take place as quickly as possible, for considerations of efficiency, this measure forms a safety measure which has been obtained on the basis of tests. This is because it has been found that the reaction forces which are desired in the primary pulley after a revolution of this nature correspond to the pinching force applied in the secondary pulley when the pulley is set in motion from the tensioned state of the belt. In the meantime, the reaction force in the primary pulley builds up abruptly from zero to virtually 100% of the pinching force to be expected from the application of pinching force on the secondary pulley.

A third particular refinement of the solution of the problem underlying the invention also consists in providing the transmission with a so-called DNR set in order to enable the direction of travel to be reversed, the DNR set being provided, for this purpose, with a coupling and being coupled to the secondary shaft, and the transmission being controlled in such a manner that slippage of this coupling takes place while the transmission is at a standstill and during at least a number of initial revolutions of the primary pulley.

In a further preferred embodiment, the pinching force is controlled in accordance with the arrangement for stationary pulleys for a few revolutions, so that a relatively inexpensive speed sensor can be used instead of, for example, an encoder for detecting rotation. Another preferred embodiment relates to a transmission with rotation-dependent contact elements which indicate the presence or absence of a partial or of at least a full rotation.

Furthermore, as particular solutions, the invention comprises a transmission in which, during that phase of revolution of the primary pulley which comprises the initial standstill, the torque transmitted by a drive-off clutch accommodated in the primary shaft is substantially lower than during the immediately following phase. To this end, delay means may be arranged in the clutch. These means are preferably electronically controlled.

According to yet another particular solution according to the invention, the transmission is provided with antislip detection and control means and also with signalling means in order to be able to signal the control system of a motor to which the transmission is or will be coupled. An antislip detection and control system of this nature is known from the international patent publication WO 95/27159. This system may be insufficiently effective if the source of the pinching force, in this case the pump 21 of the transmission, for economic reasons has a limited capacity up to the maximum pressure which is to be delivered during operation. In such a case, according to the invention, the design of a drive train is advantageously characterized in that in the initial phase the maximum torque to be transmitted is adapted to the maximum torque which can be transmitted on the basis of the available pinching force or pump pressure. In order to be able to realize this solution, the antislip system according to the invention is provided with the abovementioned signalling means.

According to yet another particular solution, according to the invention a continuously variable transmission of the present type is accommodated in or is suitable for being accommodated in a drive train comprising a drive unit, such as an internal combustion engine, and this is controlled in such a manner that the maximum torque to be transmitted in the abovementioned initial phase is limited to a maximum until the vehicle or the primary pulley has reached a defined speed.

The invention furthermore comprises all possible combinations of the particular solutions described. According to the invention, a particular combination consists in increasing the secondary pinching force during the initial phase and intervening with the engine or clutch takes place only when, on the basis of the torque to be transmitted as detected by the control system, the available secondary pinching force the case in so-called stall conditions under which the engine power is increased to a maximum while the vehicle brake is being actuated, approaches a maximum value given by the transmission system.

BRIEF DESCRIPTION OF THE DRAWINGS

The invention is explained in more detail below with reference to a drawing, in which.

DETAILED DESCRIPTION OF THE INVENTION

Figure 1:
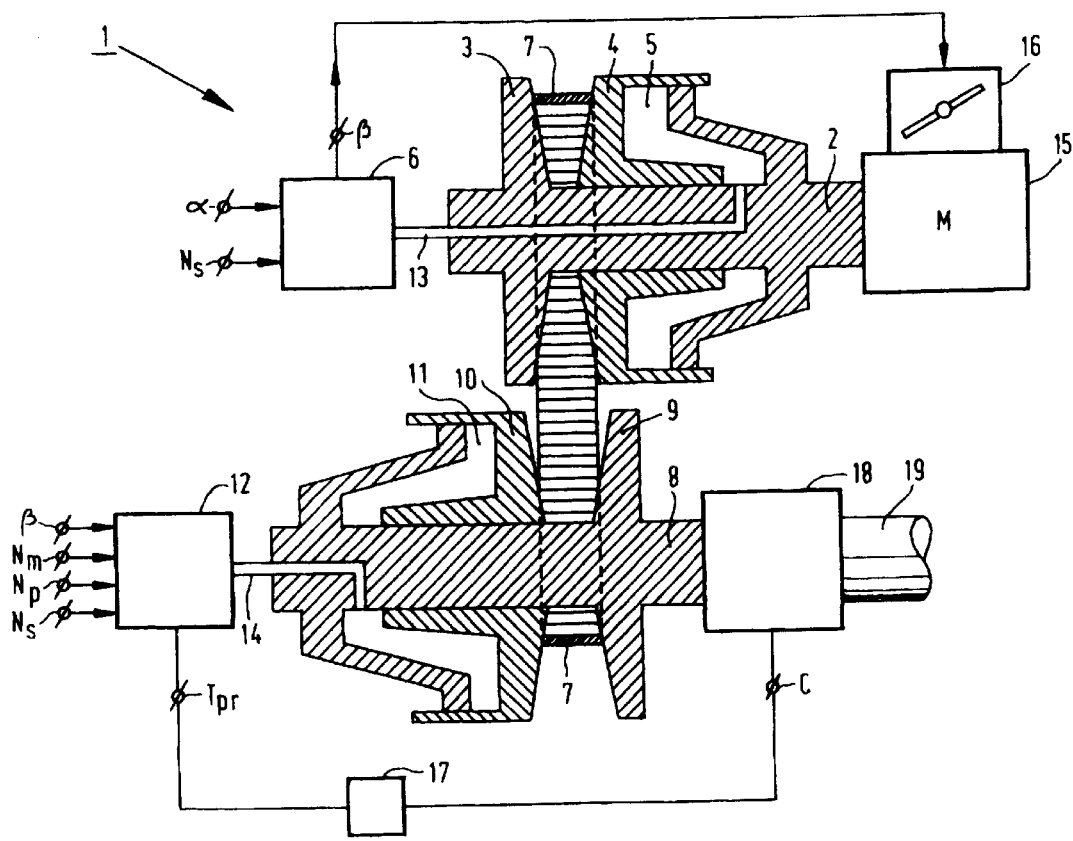
FIG. 1 diagrammatically depicts an electronically controlled continuously variable transmission.

FIG. 1 shows an embodiment of an electronically controlled continuously variable transmission. The transmission 1 comprises a primary shaft, alternatively denoted drive shaft 2, on which a primary pulley, in the form of conical discs or primary pulley halves 3 and 4, is arranged, of which the pulley half 3 is fixed to the primary shaft 2 and the primary pulley half 4 can be displaced along the shaft 2. In the embodiment of the transmission 1 illustrated, the axially displaceable pulley 4 can be displaced by exerting a hydraulic pressure in a cylinder chamber 5. The pressure in the cylinder chamber 5 is controlled by primary electronic control means 6 which are connected to the cylinder chamber 5 and the function of which is to set the radius of revolution of a drive belt 7 arranged between the pulley halves 3 and 4 by adjusting the pressure in the cylinder chamber 5. The drive belt 7 is of the so-called push belt type, i.e. is provided with transverse elements which surround one or more sets of metal rings, via which push belt a pushing force can be transmitted between the two pulleys.

The transmission 1 furthermore comprises a secondary or driven shaft 8, on which a pulley is arranged which has secondary pulley halves 9 and 10, of which the pulley half 9 is fixed to the shaft 8. The pulley half 10 which can be displaced axially on the shaft is displaced by exerting pressure in a cylinder chamber 11 which is connected to secondary electronic control means 12.

The control means 6 and 12, respectively, are connected, by means of lines 13, 14, respectively, to the cylinder chambers 5 and 11, respectively. The tension in the drive belt 7, which is also positioned between the secondary pulley halves 9 and 10, is maintained by exerting a suitable pressure in the cylinder chamber 11 by means of the secondary electronic control means 12.

With the aid of the control means 6 and 12, respectively, the transmission ratio and the tensile force in the drive belt 7 are respectively affected hydraulically. For this purpose, the control means 6 and 12 contain primary and secondary displacement means which are to be explained in more detail. These displacement means do not necessarily have to be designed in order to affect the transmission ratio and the tensile force hydraulically, but rather it is conceivable for these displacement means to be of electronic nature and to contain suitable electromechanical transducers, in order, by displacing the pulley halves 4 and 10, respectively, to make it possible to affect the transmission ratio and the tensile force in the drive belt 7, respectively. The primary and secondary displacement means, which are thus of electromechanical design, may, for example, contain a wormwheel which can be set in rotation and with which the pulley halves 4 and 10 are displaced axially. The hydraulic design of the primary and secondary displacement means will be explained in more detail in the following text.

The transmission 1 is intended to be coupled to the primary shaft 2 of a driving engine 15 which is operated with the aid of a throttle 16 which is coupled to an accelerator pedal (not shown) and which, in a manner known per se, receives an electronic signal from the primary electronic control means 6.

The transmission 1 furthermore comprises further electronic control means 17 which are connected to the secondary electronic control means 12 via terminal ($T_{pr}$). Via a command input (C), the output signal from the further control means 17 is fed to coupling means 18 which are coupled to the secondary shaft 8. Via a shaft 19, part of which is illustrated, the coupling means 18 transmit the torque, which is ultimately controlled by the transmission, to the wheels (not shown) of a vehicle. The coupling or lockup means 18 are switched on and off by means of a signal to the command input (C) which, by means of the further electronic control means 17, is derived from a signal on terminal ($T_{pr}$), which in turn can be taken from the control means 12.

In the embodiment illustrated, the coupling or lockup means 18 (for example a torque converter) are arranged downstream of the secondary pulley in the drive direction. The means 18 may without any problem be arranged in a different configuration or at a different position in the transmission, for example on the primary shaft. In the context of the present invention, the latter arrangement will be used as the starting point. In an embodiment which is not illustrated, the primary shaft is interrupted by a torque converter which is known per se and the secondary shaft is interrupted by a so-called DNR set, which is likewise known per se, allowing the direction of travel to be reversed. To this end, a DNR set of this nature is provided with couplings.

In FIG. 1, the following are also given as input signals for the electronic control means:

λ=position of the accelerator pedal of the vehicle in which the transmission is to be accommodated;
β=position of the throttle;
Np=rotational speed of the primary shaft 2;
NS=rotational speed of the secondary shaft 8, corresponding to the vehicle speed;
Nm=rotational speed of the engine.

The electronic means may all be accommodated in a so-called electronic control unit, such as a microcomputer, from which the various electromechanical control means present, such as hydraulic slide valves, can be operated. With regard to the other components, and in so far as nothing different is shown in the preceding text, a possible design of the present invention corresponds to the design shown in Patent Publication NL-A-9000860, which corresponds to EP-A-0,451,887.

Figure 2:
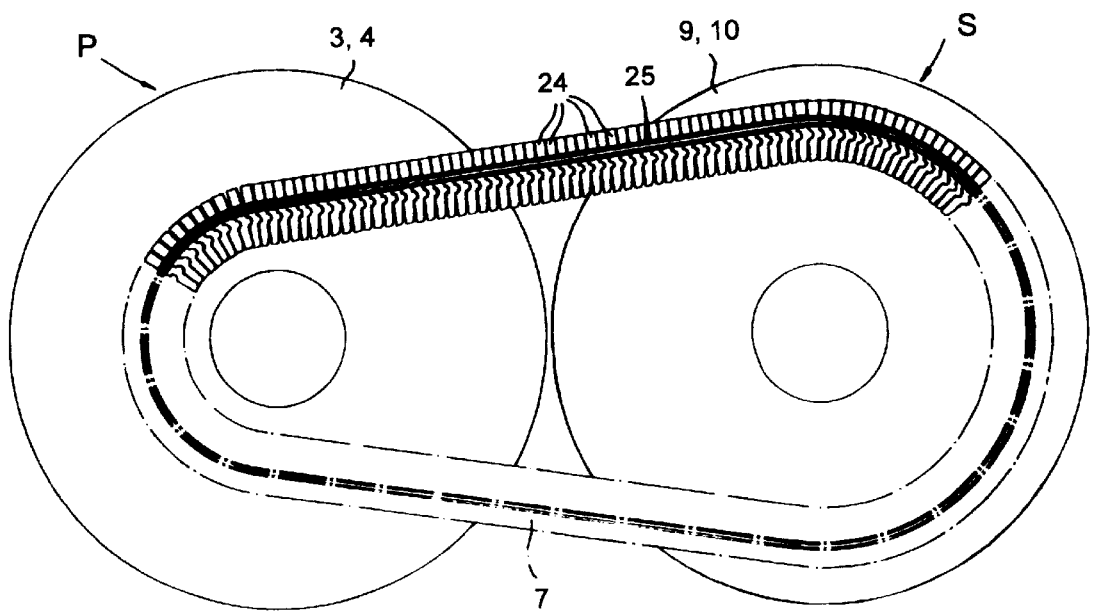
FIG. 2 diagrammatically depicts the way in which a push belt is in contact with the primary pulley while the transmission is being started up in the untensioned state of the belt.

FIG. 2 illustrates the way in which the belt 7 is in contact in the desired tensioned state in the primary pulley P and in the secondary pulley S in the low position of the transmission. In this position, the belt bears against the primary pulley with the smallest possible radius and against the secondary pulley S with the largest possible radius. Consequently, the surface area available on the primary side for the transfer from the relevant pulley to the belt 7, composed of at least one annular cord 25 and a number of links 24, is considerably smaller than that on the secondary side.

Figure 3:
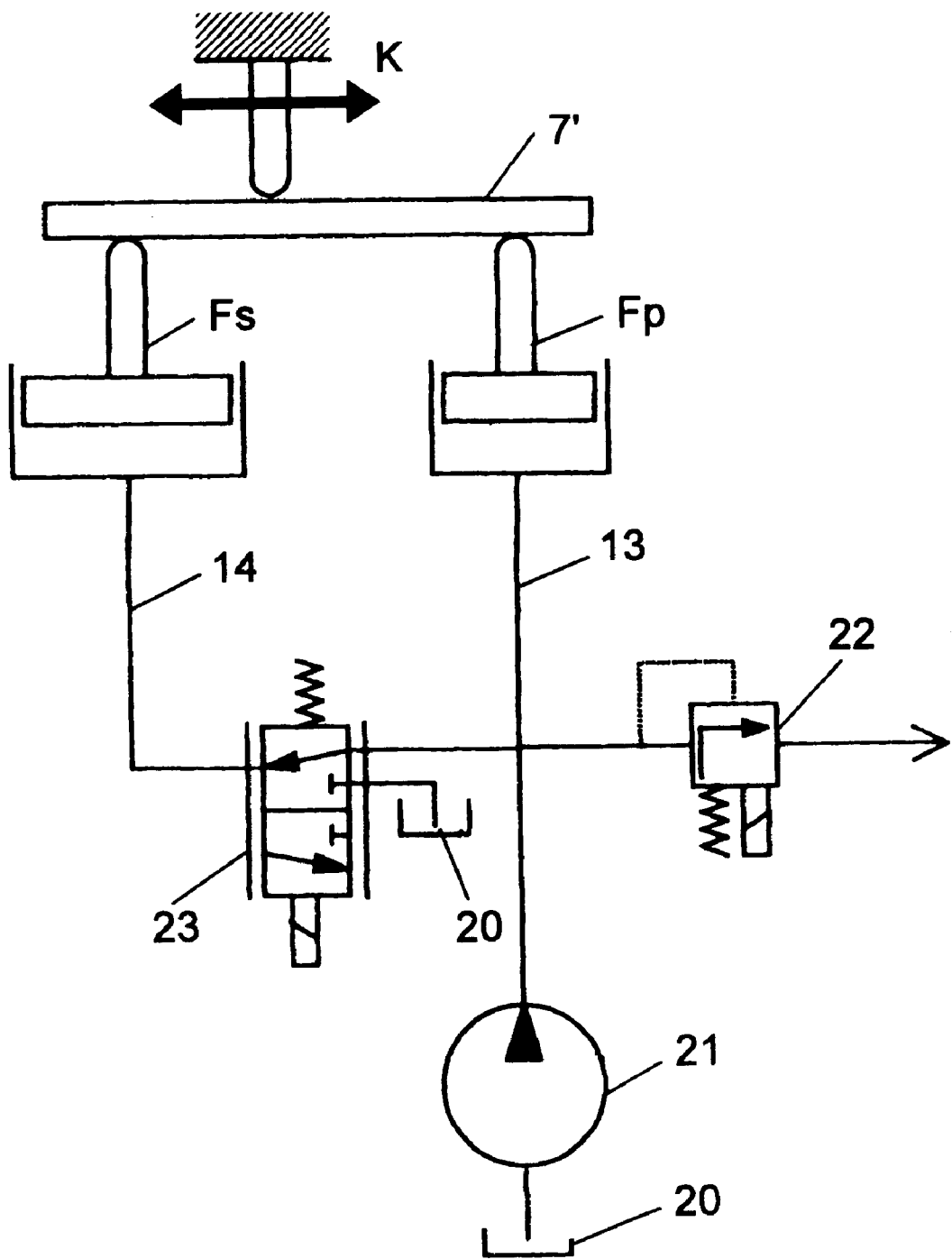
FIG. 3 diagrammatically depicts, in accordance with FIG. 2, the desired contact which occurs under rotating conditions.

FIG. 3 diagrammatically illustrates the control system of the transmission to which the present invention relates and, together with the assembly comprising pulleys P, S and belt 7, forms a so-called variator. FIG. 3 depicts an oil pump 21 which taps transmission oil from the reservoir 20 and, via line 13, feeds this oil inexpensively, i.e. without the intervention of any hydraulic valve, to the hydraulic cylinder of the secondary pulley P. The pressure prevailing in the secondary cylinder 11 is determined by the position of a control valve 22. This pressure results, determined by the surface area of the primary cylinder, in a pinching force Fs on the belt, which is depicted as a balance bar 7'. Oil removed through control valve 22 returns to the reservoir 20 after it has been diverted via a cooling and lubrication circuit.

Furthermore, as in the position illustrated, the pump may be connected to the primary cylinder 5 via the three-way valve 23. In a second position, the connection between pump and primary cylinder 5 is closed. The third position of valve 23 makes it possible for oil to flow back to the reservoir. The valve 23 is moved into one of the three positions depending on whether it is desired to increase, reduce or maintain the pressure in the primary valve. The explanation given is eminently suitable for the present master-slave control system, in which only the secondary pulley acts as a "master".

The factor K represents a transmission property which is dependent on the geometry of an assembly comprising belt and pulley and varies with the ratio and the torque to be transmitted. The factor K is a measure of the ratio between the applied pinching forces Fp and Fs, the belt remaining in an equilibrium state, i.e. a state in which the belt does not change or in which there is no ratio adjustment. In the present transmission, the magnitude of the pinching force Fp and Fs is decisive for the torque which can be transmitted, while the ratio between the two pinching forces is decisive for the transmission ratio.

In the known transmissions of the type described above, slip occurs in some cases. Nevertheless, the control system for applying pinching force is adapted to the instantaneous torque to be transmitted. This has the advantage that energy loss caused by unnecessarily hard pinching is avoided. Therefore, preventing slip by increasing the pinching force forms an unattractive solution, all the more so since the control system of the transmission generally functions well.

According to the invention, the abovementioned slip takes place primarily when torque is applied from the standstill position of the variator, for example as a result of a coupling 18 arranged between engine 15 and input transmission shaft 2 closing. In the new control system, a distinction is also made between a strategy which is suitable for the state in which the pulleys are at a standstill or virtually at a standstill and the usual strategy which during operation follows the new strategy mentioned first and which is active for comparatively only a short period and at very low vehicle speeds, and which even in city traffic and in traffic jams is passed through only when driving off from a standstill. Owing to the fact that in this phase the clutch is generally still open or has not yet moved into the "lockup" position, any effects remain virtually unnoticed by the driver. Therefore, the solution according to the present invention retains the favourable characteristics of the current master-slave control system and does not necessarily lead to a complicated lay-out of the transmission or to a complicated control system. In the particular solution in which, at a standstill, hydraulic pressure on the primary pulley is adjusted, it is possible, for example from the electronics present, for the electro-hydraulic slide valve 23 to be operated for a brief time. The required level and time of opening and the adjustment of the pressure in the secondary pulley by actuating valve 22 can be predetermined for each design of transmission.

The present invention is not limited to the embodiments which have been described above, but also relates to all the details in the figures and the contents of the claims which follow.

What is claimed is:

1. Continuously variable transmission provided with a drive pulley and a driven pulley, each having at least one axially displaceable disk for pinching an endless transmission element between the disks of the pulleys, arranged so as to transmit torque between the pulleys, the transmission being controlled at least during full movement of the pulleys, such that the pinching force[]of the drive pulley is dependent on the pinching force applied to the transmission element via the driven pulley, the pinching force applied to the transmission element is determined at least in part, as a function of a torque which is to be transmitted, wherein at least while the pulleys are at a standstill or during initial revolutions of the driven pulley prior to said full movement, the transmission is controlled such that the pinching force applied via the driven pulley at standstill or during initial revolutions of the drive pulley is at least substantially greater than the pinching force applied on said drive pulley in order to transmit a corresponding torque when controlling the transmission during said full movement.

2. The transmission according to claim 1, wherein when the pulleys are at a standstill, the pinching force of the driven pulley corresponding to at least one-and-a-half times the pinching force applied in the state of full movement of the pulleys.

3. The transmission according to claim 1, wherein the transmission is controlled as if it were at a standstill state until a minimum of one revolution of the driven shaft.

4. The transmission according to claim 1, wherein the transmission is controlled as if it were at a standstill until between at least one full revolution of the belt and a number of revolutions of the belt.

5. The transmission according to claim 1, wherein the transmission is controlled as if it were at a standstill at the latest until the driven shaft, or the vehicle in which the transmission is used, has reached a predetermined minimum speed.

6. The transmission according to claim 1, wherein contact means are connected to at least one of the drive pulley and the driven pulley, in order to detect whether the pulleys are in a stationary or moving state.

7. The transmission according to claim 1, wherein the pinching force applied is determined, at least in part, as a function of a torque which is to be transmitted.

8. Drive train comprising a drive unit and a continuously variable transmission according to claim 1, wherein the drive unit is regulated in such a manner that the maximum torque delivered by the unit is limited to a predetermined maximum until a detected, predetermined speed of the vehicle or of the secondary shaft is reached.

9. Continuously variable transmission provided with a drive pulley and a driven pulley, each having at least one axially displaceable disk for pinching an endless transmission element between the disks of the pulleys, arranged so as to transmit torque between the pulleys, the transmission being controlled at least during full movement of the pulleys, such that the pinching force of the drive pulley is dependent on the pinching force applied to the transmission element via the driven pulley, the pinching force applied to the transmission element is determined at least in part, as a function of a torque which is to be transmitted, wherein while the pulleys are at a standstill and prior to said full movement, a torque to be transmitted is transmitted with pinching force applied to the drive pulley.

10. The transmission according to claim 9, wherein the pinching force applied corresponds to the pinching force required in order to transfer the torque which is to he transmitted.

11. The transmission according to claim 9, wherein when the pulleys are at a standstill, the pinching force exerted by the driven pulley is proportional to the pinching force required in order to maintain a desired transmission ratio at a given pinching force of the drive pulley.

12. The transmission according to claim 9, wherein auxiliary mechanical means are provided in order to prevent the transmission from shifting while at a standstill and during initial revolution of said pulleys.

13. The transmission according to claim 12, wherein the auxiliary means act on the driven pulley.

14. The transmission according to claim 9, wherein the transmission is controlled as if it were at a standstill state until a minimum of one revolution of the driven shaft.

15. The transmission according to claim 9, wherein the transmission is controlled as if it were at a standstill until between at least one full revolution of the belt and a number of revolutions of the belt.

16. The transmission according to claim 9, wherein the transmission is controlled as if it were at a standstill at the latest until the driven shaft, or the vehicle in which the transmission is used, has reached a predetermined minimum speed.

17. The transmission according to claim 9, wherein contact means are connected to at least one of the drive pulley and the driven pulley, in order to detect whether the pulleys are in a stationary or moving state.

18. The transmission according to claim 9, wherein the pinching force applied is determined, at least in part, as a function of a torque which is to be transmitted.

19. Continuously variable transmission provided with a drive pulley and a driven pulley, each having at least one axially displaceable disk for pinching an endless transmission element between the disks of the pulleys, arranged so as to transmit torque between the pulleys, the transmission being controlled at least during full movement of the pulleys, such that the pinching force of the drive pulley is dependent on the pinching force applied to the transmission element via the driven pulley, the pinching force applied to the transmission element is determined at least in part, as a function of a torque which is to be transmitted, wherein the transmission is provided with a DNR set in order to enable the direction of travel to be reversed, said DNR set being provided with a coupling device and being coupled to the driven shaft, and the transmission being controlled in such a manner that slippage of the DNR coupling is effected while the vehicle in which the transmission is, or is intended to be, installed is at a standstill and during at least a number of initial revolutions of the drive pulley.

20. The transmission according to claim 19, wherein the transmission is adapted to a manner of driving off with the aid of a driving off clutch which is connected to the drive shaft.

21. The transmission according to claim 19, wherein the transmission is controlled as if it were at a standstill state until a minimum of one revolution of the driven shaft.

22. The transmission according to claim 19, wherein the transmission is controlled as if it were at a standstill until between at least one full revolution of The belt and a number of revolutions of the belt.

23. The transmission according to claim 19, wherein the transmission is controlled as if it were at a standstill at the latest until the driven shaft, or the vehicle in which the transmission is used, has reached a predetermined minimum speed.

24. The transmission according to claim 19, wherein contact means are connected to at least one of the drive pulley and the driven pulley, in order to detect whether the pulleys are in a stationary or moving state.

25. The transmission according to claim 19, wherein the pinching force applied is determined, at least in part, as a function of a torque which is to be transmitted.

26. Continuously variable transmission provided with a drive pulley and a driven pulley, each having at least one axially displaceable disk for pinching an endless transmission element between the disks of the pulleys, arranged so as to transmit torque between the pulleys, the transmission being controlled at least during full movement of the pulleys, such that the pinching force of the drive pulley is dependent on the pinching force applied to the transmission element via the driven pulley, the pinching force applied to the transmission element is determined at least in part, as a function of a torque which is to be transmitted, wherein the transmission contains a coupling device which is connected to the drive shaft and is designed or controlled in such a manner that, while the pulleys are at a standstill and during the initial revolutions of the primary pulley, the torque to be transmitted by the driven and driven pulleys during the initial state is substantially lower than that which is to be transmitted subsequently.

27. The transmission according to claim 26, wherein the coupling device is provided with electronic control means which are connected to control means for the assembly comprising pulleys and belt.

28. The transmission according to claim 26, wherein the pinching force applied is determined, at least in part, as a function of a torque which is to be transmitted.

29. Continuously variable transmission provided with a drive pulley and a driven pulley, each having at least one axially displaceable disk for pinching an endless transmission element between the disks of the pulleys, arranged so as to transmit torque between the pulleys, the transmission being controlled at least during full movement of the pulleys, such that the pinching force of the drive pulley is dependent on the pinching force applied to the transmission element via the driven pulley, the pinching force applied to the transmission element is determined at least in part, as a function of a torque which is to be transmitted, wherein the transmission is provided with anti-slip detection and control means and with signalling means which are suitable for electronic feedback to an electronically controlled drive source.

30. The transmission according to claim 29, wherein the pinching force applied is determined, at least in part, as a function of a torque which is to be transmitted.

* * * * *